United States Patent

[11] 3,578,272

[72] Inventor Charles S. Thompson, Jr.
 Vincentown, N.J.
[21] Appl. No. 839,989
[22] Filed July 8, 1969
[45] Patented May 11, 1971
[73] Assignee Gulf & Western Industrial Products Company
 Grand Rapids, Mich.

[54] AIRCRAFT ARRESTING DEVICE
 12 Claims, 7 Drawing Figs.
[52] U.S. Cl. .................................................. 244/110,
 242/55.2
[51] Int. Cl. ................................................... B64f 1/02
[50] Field of Search ....................................... 242/191,
 192, 193, 197, 55.2, 210, 75, 75.1, 75.2, 75.3;
 244/110; 188/65.1, 152.86, 166

[56] References Cited
 UNITED STATES PATENTS
3,348,784 10/1967 Gardiner et al. ............... 242/197X
3,481,563 12/1969 Marcheron .................... 244/110

*Primary Examiner*—Milton Buchler
*Assistant Examiner*—Paul E. Sauberer
*Attorney*—Meyer, Tilberry and Body ABSTRACT: An aircraft arresting device includes a rotatable reel having an elongated flat tape coiled thereon in layer-by-layer convolutions. The tape has flat faces and side edges, and the reel has sideplates between which the tape is coiled on the reel hub. The side edges of the tape engage the sideplates of the reel to provide a frictional retarding force against slippage between adjacent layers of tape on the reel when the tape is placed under tension and uncoiled from the reel. The inner surfaces of the reel sideplates may be coated with a material having a high coefficient of friction to enhance the frictional retarding force acting against the side edges of the tape. The sideplates of the reel may be movable toward one another to vary the amount of force acting against the side edges of the tape.

Patented May 11, 1971  3,578,272

INVENTOR.
CHARLES S. THOMPSON JR.
BY
Meyer, Tilberry & Body
ATTORNEYS

Patented May 11, 1971
3,578,272
3 Sheets-Sheet 2
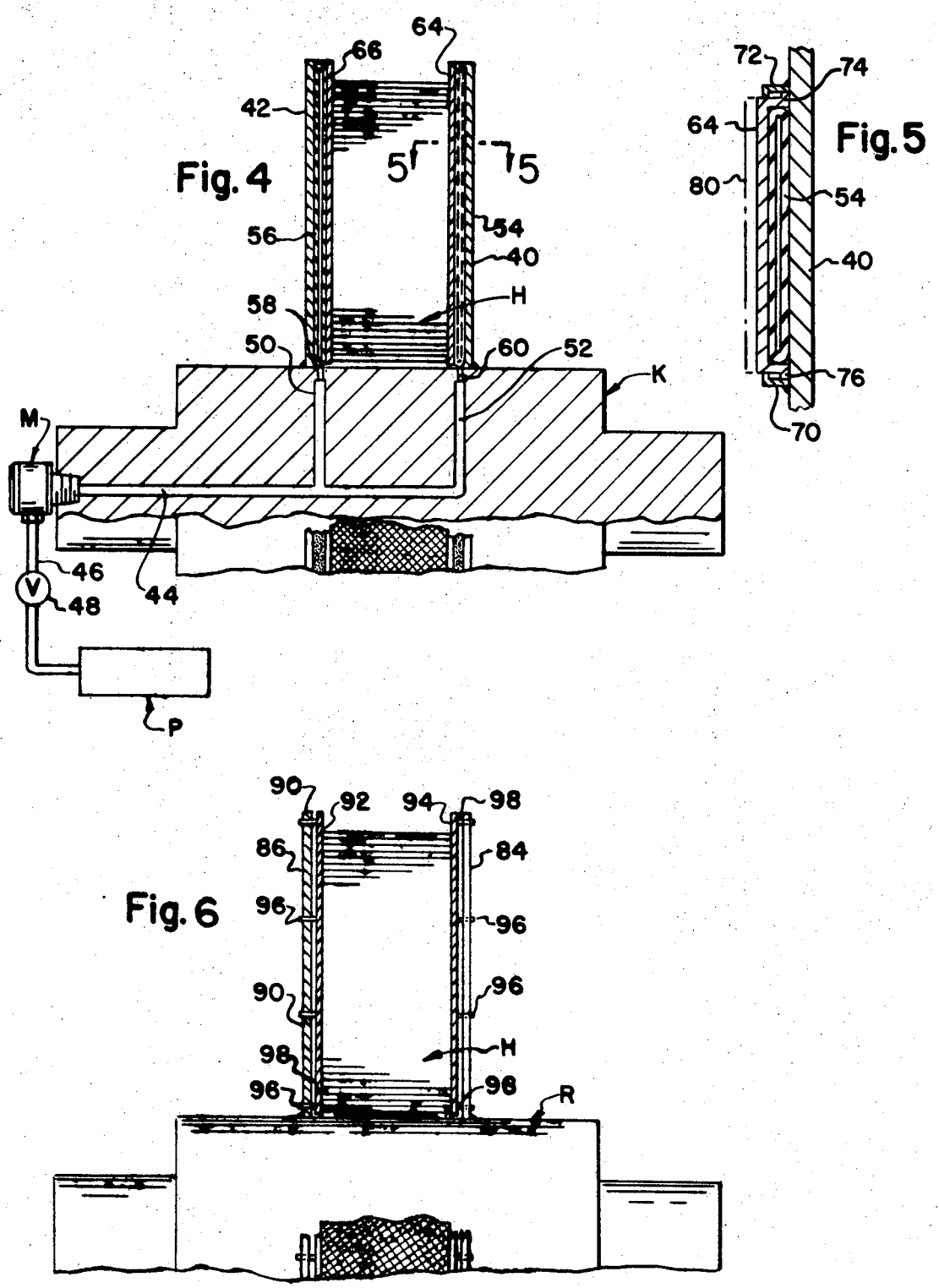
INVENTOR.
CHARLES S. THOMPSON, JR
BY
Meyer, Tilberry & Body
ATTORNEYS

AIRCRAFT ARRESTING DEVICE

BACKGROUND OF THE INVENTION

This application pertains to the art of arresting movement of moving bodies and more particularly to arresting movement of landing aircraft.

The invention is particularly applicable to apparatus for arresting movement of landing aircraft and will be described with particular reference thereto although it will be appreciated that the invention can also be used to arrest other moving bodies.

One prior type of aircraft arresting device includes a rotatable reel having an elongated flat tape coiled thereon in layer-by-layer convolutions. In such apparatus, the tape includes a free end extending from the reel to connection with a steel cable stretched transversely across an aircraft runway. A landing aircraft engages steel cable and produces tension in the free end of the tape to cause rotation of the reel and uncoil the tape therefrom. The reel is provided with a brake for retarding its rotation and this produces tension in the tape which brings an aircraft to a stop. Such arrangements are described in U.S. Pat. Re. Nos. 25,406 and 3,142,458 to Byrne et al. which are hereby incorporated into the disclosure of this specification.

In the type of aircraft arresting device described, the tension in the free end of the tape during arrestment of an aircraft is transmitted to all the layers of tape on the reel. This tension tends to cause relative slippage between adjacent layers of tape on the reel. The tension in the tape also provides a compressive force on the convolutions of tape on the reel so that there is a normal force between adjacent layers of tape to provide frictional resistance against relative slippage. However, the tape convolutions on the reel are subjected to a very high centrifugal force when the reel is rotated during an arrestment and the compressive force is reduced by this centrifugal force which acts in an opposite direction. Therefore, the tape convolutions on the reel often slip relative to one another during an arrestment and the tape convolutions tighten themselves on the reel. In addition, the tape is somewhat loosely wound upon the reel because it is impractical to provide as much tension in the tape when rewinding as the tension existing in the tape during an arrestment. Providing such tension during rewinding would require an extremely powerful rewinding engine. In addition, it would not be desirable to have a tape stored on a reel for a long period of time under such high tension because it may cause fatigue failure of yarns in the tape much earlier than normally expected. When tightening of the tape convolutions on the reel occurs due to slippage of adjacent layers of tape on the reel, the free end of the tape momentarily goes slack. Once the slippage has stopped, the aircraft and the arresting apparatus are subjected to a very destructive impact load. Therefore, it would be desirable to prevent relative slippage between adjacent layers of tape on the reel during an arrestment to avoid destructive impact loads on an aircraft and on the arresting apparatus.

SUMMARY OF THE INVENTION

In accordance with the present invention, an aircraft arresting device includes a rotatable reel having an elongated flat tape coiled thereon in layer-by-layer convolutions. The tape includes a free end extending from the reel and the free end is connected to a steel cable which is stretched transversely across an aircraft runway. A landing aircraft engages the steel cable and produces a tension in the free end of the tape which causes rotation of the reel to uncoil the tape therefrom. The reel is provided with a brake in the manner described in the aforementioned Byrne patents. The tension in the free end of the tape is also transmitted to the tape convolutions on the reel and this tends to cause tightening of the convolutions on the reel due to slippage between adjacent layers of tape convolutions. In accordance with the present invention, means is provided for preventing relative slippage between adjacent tape convolutions on the reel. More specifically, the reel of the present invention includes side plates between which the tape convolutions extend. The sideplates of the reel engage the side edges of the tape to provide a frictional retarding force against slippage of the tape. The inner faces of the reel sideplates may be provided with a facing material having a high coefficient of friction to enhance the frictional resistance against slippage of the tape. In another arrangement, the sideplates on the reel may be movable toward one another to vary the normal force acting against the side edges of the tape and thereby vary the frictional force retarding slippage.

It is a principal object of the present invention to provide a means for preventing relative slippage between adjacent tape layers of a tape coiled upon a rotatable reel of an aircraft arresting device.

It is also an object of the present invention to prevent slippage between adjacent layers of tape on a reel by providing a frictional retarding force against slippage acting against the side edges of the tape.

It is a further object of the present invention to provide a means for preventing relative slippage between adjacent tape layers coiled upon a reel by placing movable sideplates on the reel along with an adjustment means for adjusting the force with which the sideplates engage the side edges of the tape.

BRIEF DESCRIPTION OF THE DRAWING

The invention may take physical form in certain parts and arrangements of parts, preferred embodiments of which will be described in detail in this specification and illustrated in the accompanying drawings which form a part hereof.

FIG. 4 is a partial elevational cross-sectional view of a reel having another improved arrangement of the present invention incorporated therein for preventing relative slippage between adjacent tape layers of a tape coiled upon the reel;

FIG. 5 is a partial sectional view taken on line 5-5 of FIG. 4;

FIG. 6 is a partial elevational cross-sectional view of a reel having another form of the present invention incorporated therein for preventing relative slippage between adjacent tape layers of a tape coiled upon the reel.

DESCRIPTION OF THE PREFERRED EMBODIMENTS

Figures 1, 2, 3:
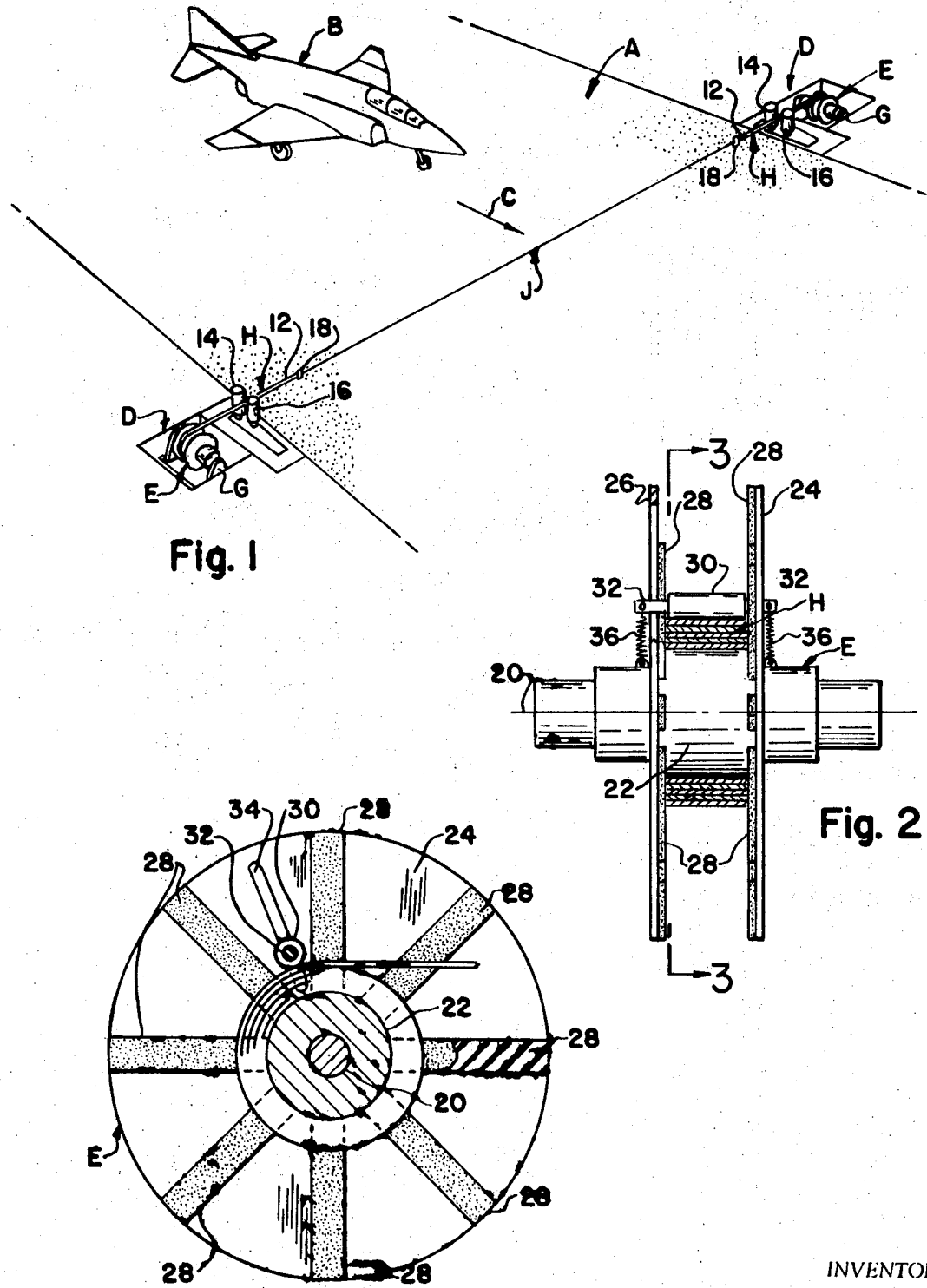
FIG. 1 is a diagrammatic illustration of an aircraft runway having an aircraft arresting apparatus installed adjacent thereto and which apparatus includes the improvement of the present invention.
FIG. 2 is an elevational view of a reel which includes the improved means of the present invention for preventing relative slippage between adjacent tape layers of a tape coiled upon the reel.
FIG. 3 is a side, elevational cross-sectional view taken in the direction of arrows 3-3 of FIG. 2.

Referring now to the drawings, wherein the showings are for purposes of illustrating preferred embodiments of the invention only and not for purposes of limiting same, FIG. 1 shows an aircraft runway A on which an aircraft B may land. Runway A is elongated in the direction of arrow C and aircraft B moves along runway A in the direction of arrow C when making a landing. Arresting apparatus D is installed adjacent the side edges of runway A for stopping movement of aircraft B when making a landing. Arresting apparatus D includes rotatable reels E rotatably mounted on supports G. Such arrangements, along with braking devices for retarding rotation of reels E, is described in detail in the aforementioned patents to Byrne et al. Reels E have elongated flat tapes coiled thereon in layer-by-layer convolutions. Tapes H include free ends 12 extending between guide sheaves 14 and 16 to points of connection 18 with a steel cable J which is stretched tightly transversely across runway A. Connections 18 may be of the type disclosed in U.S. Pat. Nos. 3,195,939; 3,264,017; or 3,333,310 to LaGarde.

As shown in FIGS. 2 and 3, reel E includes a central rotational axis 20 in a hub 22 on which tape H is coiled. Reel E also includes spaced-apart sideplates 24 and 26 between which the convolutions of tape H extend. In one arrangement, the inside surfaces of reel sideplates 24 and 26 have elongated strips of material 28 having a high coefficient of friction. Strips 28 may be of such materials as neoprene, natural rubber, silicone rubber, urethane plastic or vinyl. Such materials yieldingly engage the edges of a tape to provide a high frictional force against slippage while offering low abrasion which might unduly wear the edges of the tape. Strips 28 are suitably bonded to the inner faces of sideplates 24 and 26 by suitable adhesive. In one arrangement, the surfaces of strips 28 are roughened or cut so as to enhance its coefficient of friction. Strips 28 are spaced apart a distance which is less than the width of tape H so that the side edges of tape H are in engagement with strips 28. Any tendency for adjacent tape layers on reel E to slip relative to one another during arrestment of an aircraft is prevented by the frictional engagement between the side edges of the tape and strips 28.

In recoiling tape H on reel E after an arrestment is made, an external roller may be used to press against the tape as it is being rewound and flatten it out so that its side edges are in firm engagement with strips 28. In another arrangement as shown in FIGS. 2 and 3, a spring-biased roller may be provided on reel E. In this arrangement a rotatable roller 30 rotates on a shaft 32 which has its ends extending through elongated slots as at 34 in sideplates 24 and 26 of reel E. Springs 36 attached to the hub of reel E and to the ends of shaft 32 normally bias roller 30 inwardly toward the axis of reel E. In rewinding tape H on reel E after arrestment of an aircraft, roller 30 forces each tape convolution into a flat condition so that its side edges are in firm engagement with strips 28. Without using any roller during rewinding tape H, the tape may be stored on reel E in a substantially U-shaped condition and its side edges would not be in firm engagement with strips 28.

During arrestment of an aircraft, reel E rotates at a very high angular velocity and tape H is acted upon by very high centrifugal force. This centrifugal force tends to move portions of the tape outwardly. The normal force acting between adjacent tape layers is thereby reduced and the frictional resistance against slippage between adjacent tape layers is reduced. In the arrangement of the present invention, the firm engagement between the side edges of tape H and strips 28 also prevents movement of the tape layers outwardly under the action of centrifugal force so that a high normal force is always maintained between adjacent tape layers to prevent relative slippage.

In the arrangement of FIG. 4, reel K includes side plates 40 and 42. Reel K is provided with an elongated central bore 44. A universal connector M connects a pressurized source of air P through line 46 with bore 44. A control valve 48 may be provided in line 46 to control the flow of air from source P to bore 44. Reel K has radial bores 50 and 52 communicating with bore 44. Inflatable elastomeric bags 54 and 56 are provided adjacent the inner surfaces of sideplates 40 and 42. Inflatable bags 54 and 56 may have screw-type connectors or bayonet-type connectors as at 58 and 60 for connection with reel K to establish communication between radial bores 50 and 52 and the interior of bags 54 and 56. Additional force applying plates 64 and 66 are provided inwardly of inflatable bags 54 and 56. As shown in FIG. 5, vertical extending L-shaped members 70 and 72 are welded to the inner surface of sideplate 40. Plate 64 includes outwardly extending flanges 74 and 76 received in L-shaped members 70 and 72. When bag 54 is inflated, plate 64 moves outwardly away from sideplate 40 to a position as shown by dashed line 80. By varying control valve 48 it is possible to vary the pressure exerted by plate 64 against the side edges of tape H on reel K. A plurality of bags and plate arrangements such as described with respect to FIG. 5 may be provided around the periphery of sideplates 40 and 42 if so desired. In addition, the outer surface of plate 64 may be provided with a facing of material having a high coefficient of friction in the manner described with reference to FIGS. 2 and 3. With this arrangement, it is possible to release all air pressure from bags 54 and 56 when rewinding tape H on reel K after an arrestment and to pressurize bags 54 and 56 after tape H is completely coiled upon reel K. With such an arrangement, rewinding of tape H on reel K is not inhibited at all and inflatable bags 54 and 56 along with control valve 48 from pressurized source P make it possible to adjust the force with which plates 64 and 66 engage the side edges of tape to prevent relative slippage between adjacent tape layers.

In another arrangement, FIG. 6 shows reel R having sideplates 84 and 86. Side plates 84 and 86 are provided with a plurality of transverse holes 90. Force applying members 92 and 94 are provided with rods 96 welded to their outer faces. Force applying means 92 and 94 may be annular plates of the same shape as sideplates 84 and 86 or they may also be radial strips of metal positioned at a plurality of places around the periphery of sideplates 84 and 86. Rods 96 extend through holes 90 of sideplates 84 and 86. Coil springs 98 are positioned around shafts 96 between plates 84 and 86 and plates 92 and 94 to normally bias plates 92 and 94 toward one another and away from sideplates 84 and 86. With this arrangement, coil springs 98 bias plates 92 and 94 into engagement with the side edges of tape H to enhance the frictional retarding force against slippage between adjacent tape layers on reel R.

Figure 7:
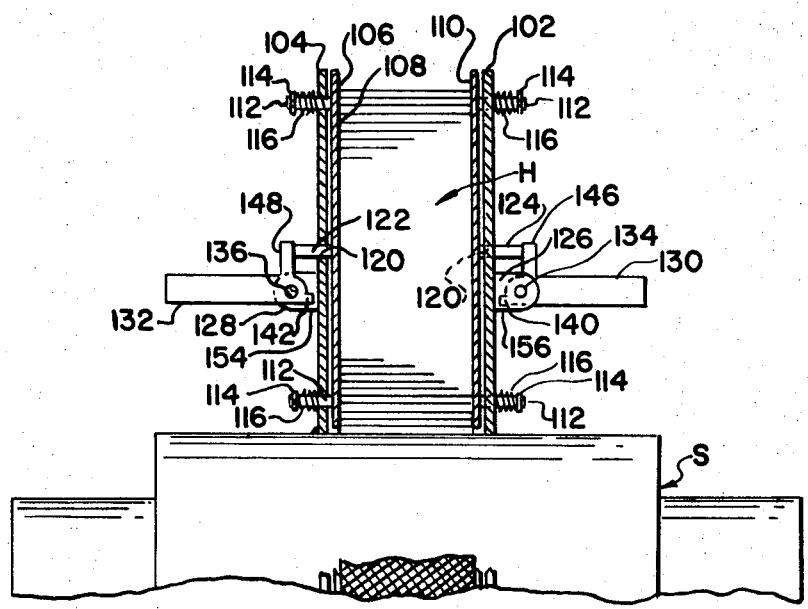
FIG. 7 is a partial, elevational cross-sectional view of a reel having still another form of the present invention incorporated therein for preventing relative slippage between adjacent tape layers of a tape coiled upon the reel.

FIG. 7 shows another arrangement in which reel S has sideplates 102 and 104 with transverse holes 106. Plate members 108 and 110, which may be the same as described with reference to FIG. 6, are provided with rods 112 welded to their outer faces. Rods 112 extend through holes 106 in sideplates 102 and 104, and C-rings 114 are received in suitable grooves in the ends of rods 112. Coil springs 116 are positioned between C-rings 114 in the outer faces of sideplates 102 and 104 to normally bias plates 108 and 110 away from one another. With this arrangement, sideplates 108 and 110 are normally not in engagement with the side edges of tape H and there is no interference with rewinding tape H on reel S. Sideplates 102 and 104 are provided with additional transverse holes 120 through which rods 122 and 124 on plates 108 and 110 extend. Bifurcated mounting brackets 126 and 128 are welded to the outer faces of sideplates 102 and 104. Weights 130 and 132 are pivotally connected as at 134 and 136 to bifurcated mounting brackets 126 and 132. Weights 130 and 132 may include an extension portion 140 and 142 extending toward the outer face of sideplates 102 and 104 to maintain weights 130 and 132 in a position not substantially lower from the horizontal than that shown when reel S is not rotating. Weights 130 and 132 also include extensions 146 and 148 which are in line with the ends of rods 122 and 124. When reel S is rotated during an arrestment, the eccentricity of weights 130 and 132 with respect to their pivot axis 134 and 136 causes the weights to pivot due to centrifugal force. This centrifugal force moves extensions 146 and 148 into engagement with the ends of rods 120 and 122 to bias plates 108 and 110 toward one another against the force of coil springs 116. In this arrangement, the force provided by plates 108 and 110 against the side edges of tape H to prevent relative slippage between adjacent tape layers is proportional to the rotational speed of reel S. High tape speed is characteristic of high tension in tape H during an arrestment while low rotational speed of reel S is characteristic of a lower tension in the tape. Therefore, the force provided by plates 108 and 110 against the side edges of tape H varies during an arrestment and is always sufficient to prevent relative slippage between adjacent tape layers coiled upon reel S. It is also possible to provide facing material on the inner faces of plates 108 and 110 in the manner described with reference to FIGS. 2 and 3.

In a preferred arrangement, suitable holes are provided in bifurcated brackets 126 and 128 for removably receiving pins 154 and 156 which engage the bottom edges of extension portions 140 and 142 to prevent weights 130 and 132 from moving under centrifugal force when reel E is being reversely rotated to rewind tape H back on reel E following arrestment of an aircraft. It will be recognized that it is also possible to eliminate springs 116, and plates 108 and 118 will simply move away from the edges of tape H during rewind when no force is applied by weights 130 and 132 due to lockout by removable pins 154 and 156.

While the reel has been illustrated as being rotatable on a horizontal axis it will be understood that the improvements of the present invention are usable with reels rotatably mounted on vertical axis or sloping axis.

Other arrangements for preventing slippage between adjacent tape layers on a reel are described in two copending patent applications of Charles S. Thompson, Jr. entitled AIRCRAFT ARRESTING DEVICE, filed on July 8, 1969. These other applications are identified by Ser. Nos. 839,870 and 839,878, and the disclosure of said other applications is hereby incorporated by reference into this application.

While the present invention has been described only with reference to certain preferred embodiments it is obvious that modifications and alterations will occur to others upon the reading and understanding of this specification.

I claim:

1. An aircraft arresting device including a rotatable reel having an elongated flat tape coiled thereon in layer-by-layer convolutions, said tape having flat faces and side edges and including a free end extending from said reel, said free end being placed in tension to uncoil said tape from said reel during arrestment of an aircraft, and pressure means applying compressive force against said side edges of said tape on said reel as said tape is uncoiled from said reel during arrestment of an aircraft.

2. The device of claim 1 wherein said pressure means is connected with said reel and rotates therewith as said tape is uncoiled from said reel during arrestment of an aircraft.

3. The device of claim 1 wherein said pressure means comprises spaced-apart members on said reel, said members being spaced apart a distance less than the width of said tape.

4. The device of claim 3 and further including roller means engaging a flat face of said tape on said reel, said roller means holding said tape in a substantially flat condition and forcing said side edges against said spaced-apart members.

5. The device of claim 3 wherein said spaced-apart members have inner surfaces engaging said side edges of said tape and said inner surfaces are provided with elastomeric material.

6. The device of claim 3 wherein at least one of said spaced-apart members is movably mounted on said reel for movement toward the other of said members, and biasing means for biasing said one member toward the other of said members.

7. The device of claim 6 wherein said biasing means comprises centrifugal force applying means responsive to rotation of said reel for moving said one member against said side edges of said tape with a force proportional to the angular velocity of said reel.

8. The device of claim 3 wherein at least one of said spaced-apart members is movably mounted on said reel for movement toward the other of said members, and selective adjustment means for selectively moving said one member toward the other of said members to vary the force applied to said side edges of said tape.

9. The device of claim 1 wherein said pressure means applying compressive force against said side edges of said tape is responsive to rotation of said reel and applies a force proportional to the angular velocity of said reel.

10. A method of arresting an aircraft comprising the steps of engaging an aircraft with engagement means connected with the free end of a flat elongated tape extending from a rotatable reel on which the tape is stored in layer-by-layer convolutions; placing the free end of the tape in tension to uncoil the tape from the reel, and applying compressive force to the side edges of said tape on said reel to prevent relative slippage of adjacent tape layers on the reel during aircraft arrestment.

11. A reel for an aircraft arresting device, said reel including a central axis and hub means on which an elongated flat tape having flat faces and side edges is adapted to be coiled in layer-by-layer convolutions, and pressure means on said reel for applying compressive force to the side edges of a tape wound on said reel.

12. The reel of claim 11 wherein said pressure means comprises spaced-apart members on said reel, at least one of said members being movable toward the other of said members.